A. KINGSBURY.
BEARING.
APPLICATION FILED MAR. 25, 1916.

1,378,544.

Patented May 17, 1921.
4 SHEETS—SHEET 1.

Inventor
Albert Kingsbury
By his Attorney

A. KINGSBURY.
BEARING.
APPLICATION FILED MAR. 25, 1916.

1,378,544.

Patented May 17, 1921.
4 SHEETS—SHEET 3.

Inventor
Albert Kingsbury
By his Attorney

UNITED STATES PATENT OFFICE.

ALBERT KINGSBURY, OF PITTSBURGH, PENNSYLVANIA.

BEARING.

1,378,544.  Specification of Letters Patent.  Patented May 17, 1921.

Application filed March 25, 1916. Serial No. 86,535.

*To all whom it may concern:*

Be it known that I, ALBERT KINGSBURY, a citizen of the United States, and a resident of Pittsburgh, Allegheny county, and State of Pennsylvania, have invented certain new and useful Improvements in Bearings, of which the following is a specification, reference being had to the accompanying drawings, forming a part thereof.

My invention relates to bearings and, more particularly, to bearings which include bearing portions, segments or shoes, that are mounted to respond to the wedging action of the lubricating fluid, and it has special reference to the members on which said bearing portions, segments or shoes are mounted.

One object of my invention is to provide a bearing of the aforesaid character that is equipped with simple pressure-distributing or equalizing means comprising a small number of parts which are inexpensive to manufacture and which are adapted to coöperate in effectually distributing the load upon the several shoes, segments or bearing portions.

Another object of my invention is to provide a bearing, comprising a circumferential series of bearing portions or segments, with a plurality of separately-acting pressure-distributing members which are interrelated with the bearing portions or segments to predeterminately distribute the pressure thereon.

Yet another object of the invention is to provide a bearing, comprising a plurality of bearing segments, wherein the segments are divided into groups and the pressures on the segments of each group are interbalanced.

A further object of the invention is to provide a bearing, comprising a plurality of groups of bearing segments, with means for distributing the pressure among the segments of each group and means for distributing the pressure among the groups of segments.

A still further object of the invention is to provide an improved pressure-distributing or equalizing block or member comprising a lever on which the bearing segments are mounted to tilt both radially and tangentially.

Another object of the invention is to provide a bearing comprising a plurality of bearing segments arranged in a plurality of groups, with all of the segments of each group mounted on a single pressure-distributing or equalizing member which is supported on a point or line that intersects the resultant of the forces acting on the segments of said group.

A further object of the invention is to provide a bearing, as just characterized, with a single pressure-distributing member on which said group-pressure-distributing members are mounted and whereby the load on the bearing is equitably distributed among the several groups of segments.

Other objects and advantages of my invention will be set forth hereinafter, and in order that my invention may be thoroughly understood I will now proceed to describe the same in the following specification and then point out the novel features thereof in appended claims.

The invention is capable of receiving a variety of mechanical expressions, several of which are shown on the accompanying drawings, but it is to be expressly understood that the drawings are for purposes of illustration only and are not to be construed as a definition of the limits of the invention, reference being had to the appended claims for that purpose.

Referring to the drawings.

Another embodiment of my invention is shown in Figs. 4, 5 and 6, of which

Still another embodiment of my invention is shown in Figs. 7 and 8 which show three shoes pivoted in the same circumference on a single pressure-distributing member.

In the form shown in Figs. 1, 2 and 3, 10 is a substantially vertical shaft to which a thrust block 11 is attached in any suitable way. Removably secured to the thrust block, by bolts 12 or other suitable means, is a thrust collar 13 having a bearing surface 14.

Figure 1:
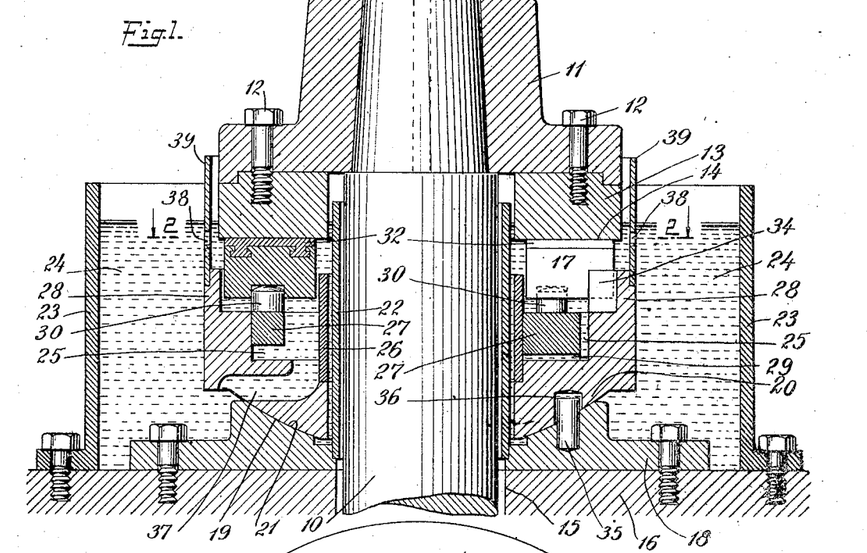
Figure 1 is a sectional elevation, taken on the line 1—1 of Fig. 2, of a thrust bearing which constitutes an embodiment of my invention.
Figures 2, 3:
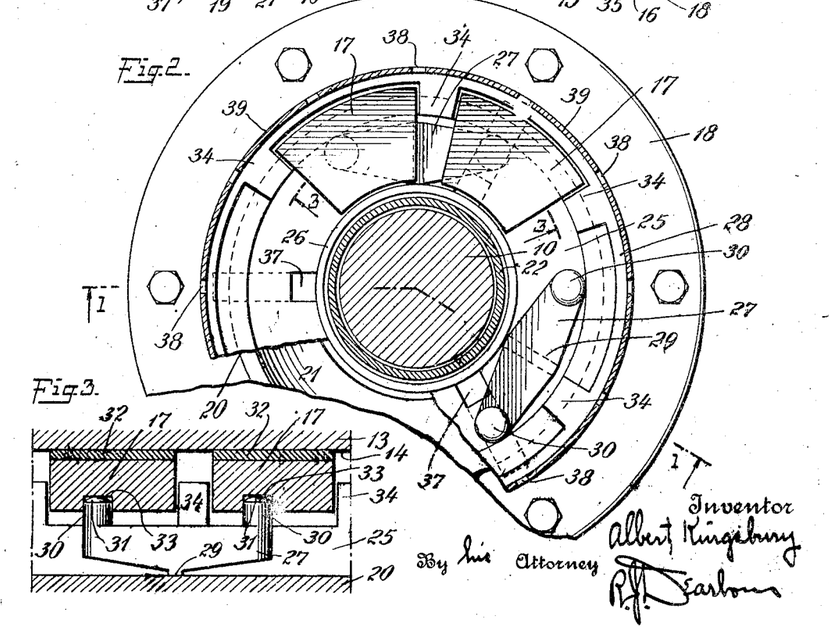
Fig. 2 is a partially sectional plan view, taken on the line 2—2 of Fig. 1.
Fig. 3 is a sectional elevation showing in detail one of the pressure-distributing members upon which two shoes are tiltably mounted.

The shaft extends through an opening 15 in a stationary frame or foundation 16 and the thrust collar 13 coöperates with a bearing member comprising a plurality of bearing portions or segments, here shown as shoes 17, which bearing member is supported on said frame or foundation 16.

Secured to the frame or foundation 16 is a base ring 18 having a spherically curved supporting surface 19. An equalizing ring 20 is mounted on the base 18 and is provided with a surface 21 which is curved to coöperate with the surface 19, the two parts being held against relative rotation in any suitable way, as by a dowel pin 35 in one of the parts extending loosely into a recess 36 in the other of the parts. Both of the members 18 and 20 loosely surround the shaft 10 and the base 18 supports a sleeve 22 which is close to the shaft and extends upwardly above the coöperating bearing surfaces. An outer wall or flange 23 is secured to the frame 16 and provides, in conjunction with the sleeve 22, an annular chamber 24 in which lubricating fluid is contained. The equalizing ring 20 has an annular recess or groove 25 which is partially formed by an attached ring 26 and in which the pressure-distributing or equalizing blocks 27 are mounted. Above said blocks the recess is enlarged by an annular projection or flange 28 to receive the bearing members or shoes 17.

In the form shown in Fig. 3, each of the blocks 27 is provided with a transverse rib 29 upon which it is supported on the bottom of the annular groove 25, and a pair of upwardly extending projections or buttons 30 located at its respective ends and preferably having spherically curved top surfaces as indicated at 31.

The shoes are preferably faced with soft metal as indicated at 32 and have recesses 33 adapted to loosely receive the projections 30 on said blocks, two shoes, in the form shown in Figs. 2 and 3, being mounted on each block. Obviously, the projections could be provided on the shoes and extend downwardly into coöperative relation to the blocks 27 without departing from the spirit of my invention.

The equalizing ring has a plurality of lugs or projections 34 within the flange 28, which extend radially inward between the shoes 17 and serve to prevent rotation of the shoes with the thrust collar 13. The shoes fit loosely into the mouth of the annular groove 25 between the ring 26 and the flange 28, so that each of them is free to tilt both radially and tangentially on the pivotal projection 30 with which it coöperates.

The shoes or segments automatically assume tilted positions by reason of the wedging action of the lubricating fluid in accordance with the principle of my previous patents, see for example Patent No. 947,242 granted Jan. 25, 1910, and Patent No. 1,117,499 granted Nov. 17, 1914.

The lubricating fluid which is contained in the reservoir 24 passes inwardly through passages 37 in the equalizing ring 20 and enters the annular recess 25. From the spaces between the shoes, which are thus filled, the lubricating fluid is forced between the bearing surfaces and is discharged centrifugally through holes 38 in a perforated baffle ring 39. The ring 39 may be conveniently mounted on the flange 28, as shown in Fig. 1.

Each group of segments or shoes 17, 17 and the pressure-distributing or equalizing lever member 27 on which they are mounted constitute what may be termed an individual balanced unit or system, in which the load or bearing pressure on each segment is entirely supported on the single pivot connection 30—31 between the segment and the lever member, and the resultant of the pressures on the several segments of the unit is carried on the single pivotal connection 29 between the lever member and the ring 20. Under the conditions of equilibrium which are automatically established in the system, the resultant of the pressures (which are concentrated on the pivot supports 30—31) will pass through the point or line of support of the unit or system as a whole; i. e., through the axis of the rib or rocker 29. The equalizing ring 20—which is free to rock in any direction on its spherical seat—will then adjust itself so as to equalize the resultants of the pressures on each unit or system; or, otherwise stated, to generally equalize the pressures on each axial or pivotal connection between the lever members 27 and the ring member 20. In this way the resultants of the pressures on the unit systems may be equalized, while the pressures on the several bearing portions or segments comprised in each system may be distributed as desired, since, while the moments of the pressures on the respective bearing portions about the fulcrum of each system must be balanced, said pressures will be distributed in accordance with the lengths of the lever arms from said fulcrum to the points at which the pressures on the bearing portions act on the members 27.

Figure 4:
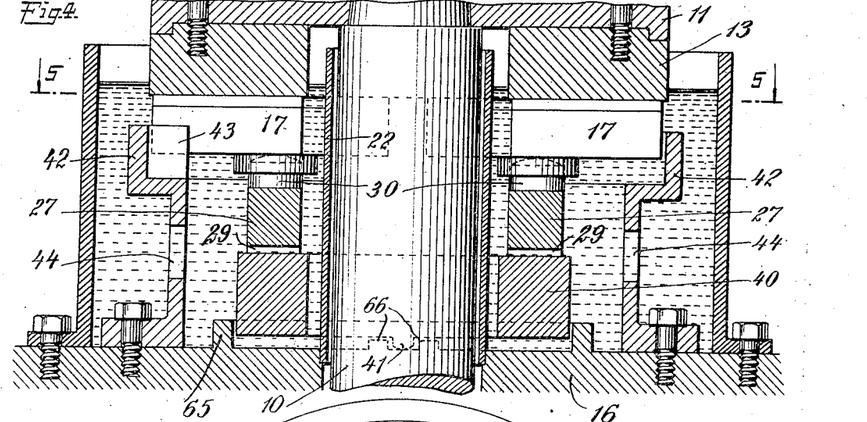
Fig. 4 is a sectional elevation on the line 4—4 of Fig. 5.
Figures 5, 6:
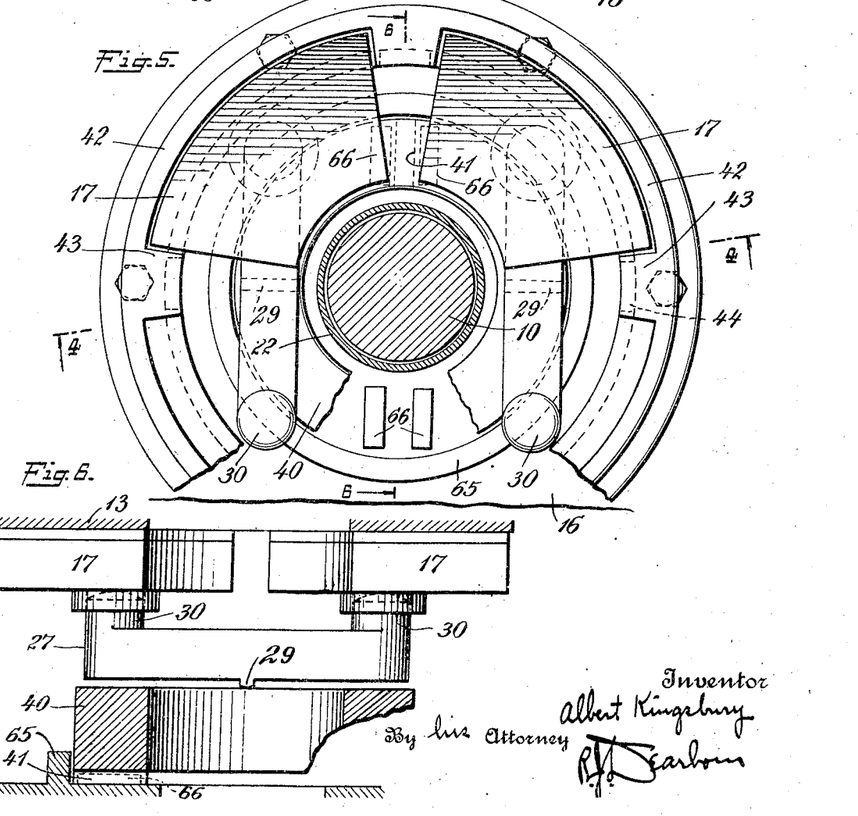
Fig. 5 is a partially sectional plan view on the line 5—5 of Fig. 4.
Fig. 6 is a sectional elevation on the line 6—6 of Fig. 5, with the shaft removed.

In the form shown in Figs. 4, 5 and 6, to which special reference may now be had, the structure differs from that already described in that the pressure-distributing or equalizing blocks 27 on which the bearing segments or shoes 17 are mounted, instead of being supported on an equalizing ring of the character above described, are mounted in pairs on another form of tiltable pressure-distributing member 40.

In this embodiment of the invention where four shoes are shown, the member 40 is ring-shaped in order to avoid interference with the shaft and is provided with ribs 41 which are in alinement with each other on opposite sides of the shaft and constitute a knife edge or rocking support for said member. The member 40 is free to tilt on the frame 16 on which it is mounted and the blocks 27 are mounted on the member 40 so as to tilt about axes at right angles to the axis of movement of the member 40. It is thus evident that the members 27 and 40 coöperate so as to distribute the pressure upon the several bearing portions or segments of each unit and among the several units, in accordance with the principle above discussed. The annular pressure-distributing member tiltable about an axis, however, is not specifically claimed herein, as the same forms the subject of claims in my application Serial No. 188,726, filed Aug. 29, 1917.

It is obvious that if a greater number of segments are desired, eight, sixteen, or some other multiple of two may be utilized by providing a pressure-distributing block for each pair of segments, and a pressure-distributing member for each pair of blocks, the number of intermediate members being such as to finally provide a single pair which may be mounted on a ring-shaped member corresponding to the member 40.

The shoes are shown as held in place against turning on their pivots or rotating with the thrust collar by any suitable means, preferably comprising a ring-shaped stationary member 42 suitably shaped and provided with lugs 43 as indicated in the drawings. Said member 42 is perforated as shown at 44 to permit free circulation of the lubricating fluid.

The equalizing ring 40 may be held loosely in position by an annular rib 65 on the base 16 and prevented from shifting circumferentially by lugs 66 which extend on opposite sides of the pivot ribs 41 as shown in Figs. 4 and 5.

The shoes which are held in place as above indicated serve to hold the blocks 27 in place by reason of their interengagement with the pivot projections 30.

In the case of this last described construction each pair of segments or shoes 17—17 and the lever member 27 on which they are pivotally mounted constitute the balanced unit that corresponds to the similarly designated units of the first described construction; and the pivoted ring member 40 corresponds in action to the equalizing ring 20. The levers 27 distribute the pressures on the individual segments of each group as heretofore explained; and the pivoted ring 40 suitably distributes the load on the respective groups.

Figure 7:
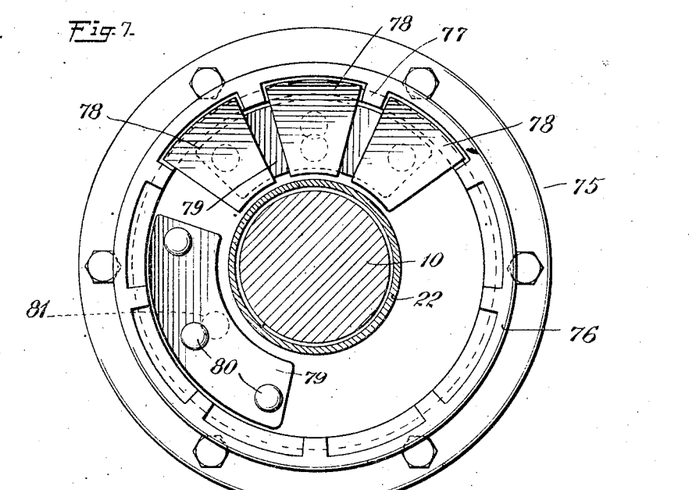
Figure 8:
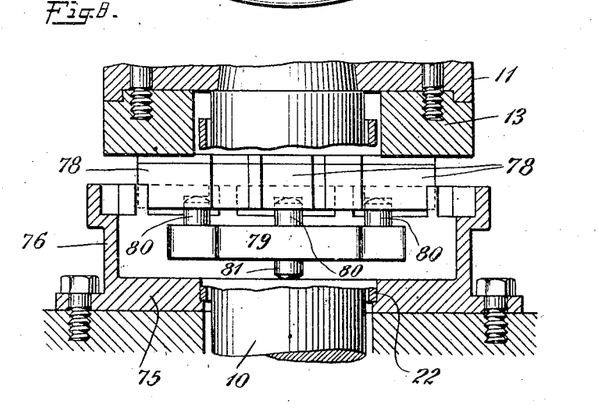

Instead of supporting two adjacent bearing segments or shoes on one pressure-distributing block as shown in Fig. 3, for example, the pressure-distributing block may be constructed as shown in Figs. 7 and 8 to support three or more adjacent bearing segments or shoes.

The base 75 in the form here illustrated has a flange 76 with lugs 77 to hold bearing shoes 78 in position. Within the flange 76 are pressure-distributing members 79 which, in the form shown, have three outwardly extending projections 80 upon which the shoes 78 are tiltably mounted. The shoe pivots are disposed in the circumference of a circle and consequently are located at the corners of a triangle. Each of the members 79 is further provided with a downwardly extending projection 81 which is positioned within the triangle in line with the resultant of the forces acting at the three vertices thereof and constitutes a pivotal mounting for said member. Obviously, the projections 80 and 81 could be positioned on the shoes and base respectively without departing from the spirit of this invention. The structure of the bearings shown in Figs. 7 and 8 otherwise correspond, in general, to those previously described, and corresponding parts are designated by the same reference characters.

The pressure-distributing or equalizing block 79 performs substantially the same function as the pressure-distributing block 27 of the previous figures, except that it distributes the load among three segments or shoes at once instead of two. Here also, the moments of the pressures on the bearing portions or shoes about each fulcrum 81 must be balanced, but the pressures on the several bearing portions or shoes depend upon the respective lever arms from said fulcrum to the points at which said pressures act on each member 79, which may be selected to secure the desired distribution of sustaining pressures.

Figure 9:
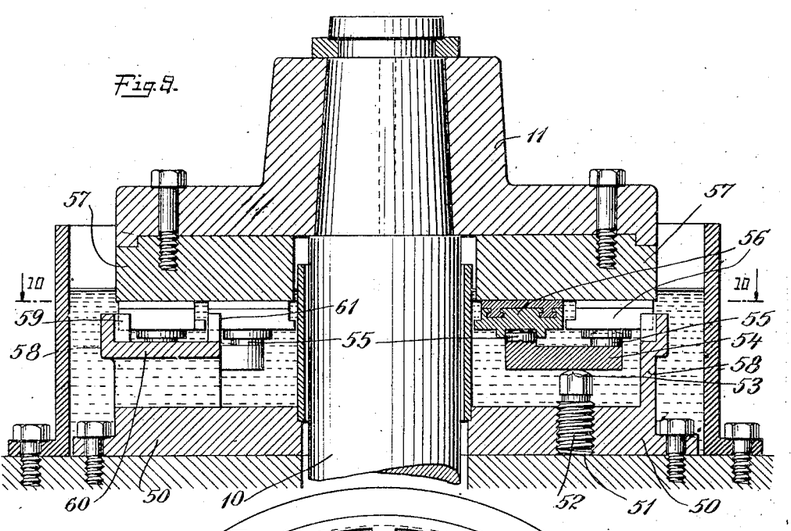
Figs. 9 and 10 show still another embodiment of my invention in which the bearing shoes are arranged in concentric annular groups.
Figure 10:
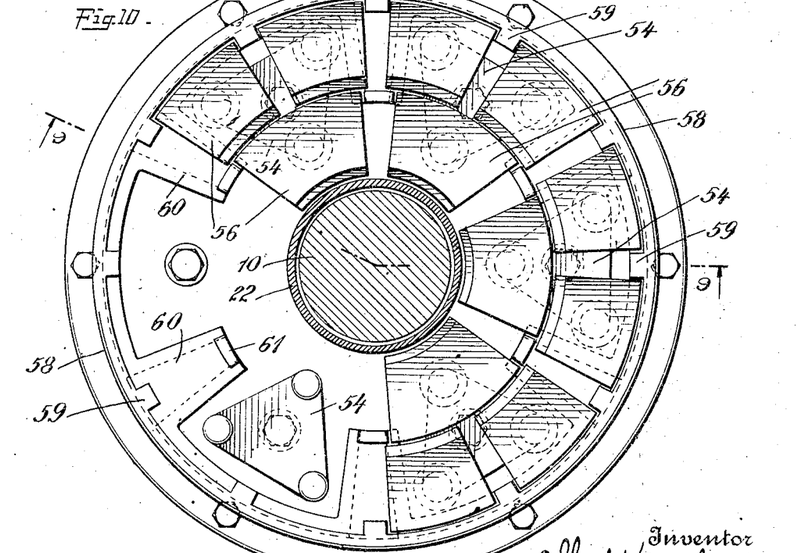

In addition to distributing the pressure between circumferentially spaced shoes said member may distribute the thrust pressure between the shoes of different concentric annular groups as shown at 54 in Figs. 9 and 10. In the form here shown, each pressure-distributing member or block 54 is provided with three upwardly extended projections 55 for engagement in recesses in the segments or shoes 56. Each block furthermore rests on an upwardly extending projection 53 positioned in line with the resultant of the forces acting on said projections 55. By suitably selecting the distances between the respective projections 55 and the point of engagement of the projection 53 with each block 54, the pressures on the several segments of each group may be equalized or suitably distributed, either radially or circumferentially, or both, to secure differential sustaining pressures. In the form here shown, said projections 53 are bolts 52 threaded into openings 51 in the base-ring 50, said bolts preferably having spherically-shaped heads as shown. The resultant of the pressures on the several groups of units may be equalized or adjusted by suitably adjusting the bolts 52. It will be apparent that the type of pressure-distributing member here shown is also available for equalizing, or otherwise distributing, the pressure on more than three segments arranged in one or more circumferential groups.

This arrangement is particularly desirable when the bearing is called upon to sustain a very heavy thrust pressure, and therefore has a thrust collar which is relatively wide, because when a collar or disk such as the collar 57 in Figs. 9 and 10 is in operation, it has a tendency to heat and to assume a frusto-conical shape of low altitude, instead of maintaining its original shape in which the bearing surfaces are in a single plane. The pressure-distributing members 54 function to equalize or suitably distribute the pressure between the inner and outer shoes of each group as well as between the circumferentially-spaced shoes of each group and so not only maintain the desired pressure in spite of the fact that the thrust collar may be slightly dished or distorted in operation, but also tend to avoid the unequal wearing of the collar.

The shoes are held against turning improperly and against displacement by a flange 58 having lugs 59 extending between the shoes 56 of the outer series and webs 60 from which lugs 61 extend between the shoes of the inner series.

It will be noted that in all of the illustrative embodiments of my invention hereinbefore described, one of the relatively rotatable bearing members comprises a circumferential series of bearing portions or segments, which are assembled in groups, or units, each of which consists of two or more adjacent segments tiltably mounted at the ends or vertices of separately-acting pressure-distributing or equalizing blocks that are themselves tiltably supported at what may be termed the centers of pressure of the groups of segments. This arrangement secures an automatic equalization or predetermined distribution of the bearing pressure on all of the segments of one group even when the said segments may vary considerably in thickness—either because of variations in machining or because of inequalities in subsequent wear or from unequal heating during running, etc.,—or in surface form or area. This is a very great advantage, particularly in the case of very large bearings, not only because it reduces the cost of construction and largely eliminates the care ordinarily required in assembling and adjusting the bearing parts, but also because it facilitates the use of a larger number of smaller bearing segments or shoes—as the individual interbalanced elements of a unitary group—and thus improves the action of the bearing both in maintaining the desired oil films between the bearing surfaces and in avoiding the detrimental effects due to the "crowning" of those surfaces under unequal heating. The pressure on the several segments or shoes of any one group having thus been automatically distributed in accordance with the desired reactive or sustaining pressures which it is desired to maintain on each segment or shoe—as just explained—the distribution of the load on the different groups or units may, in turn, be effected either by placing the pivotal supports of the pressure-distributing members of each group on a tiltable rim—two forms of which are shown respectively in Figs. 1 and 4 (or 6)—or by making those supports manually adjustable in the manner illustrated, for example, in Fig. 9. And here again the advantage of assembling the bearing segments or shoes in separate groups or units is rendered apparent by the immediate reduction in the number of the adjustable points of support on the base ring (whether that ring be fixed or tiltable) and the consequent wider separation of those points on the said ring—which permits of a quicker and more perfect equalization or subdivision of the bearing load over the different groups of segments or shoes considered as separate units. The flexibility of the pressure-distributing blocks may contribute toward the automatic distribution of the pressure on the segments or shoes which they support, and may be particularly advantageous when more than three segments or shoes are supported on a single member.

It will therefore be perceived that I have invented a simple and effective system of pressure-distributing members whereby the pressure on the several bearing portions or segments may be equalized or otherwise distributed in accordance with the character of the oil films which it is desired to maintain. The term "equalizing member," or similar expressions, as herein used, is therefore sufficiently broad to embrace means for effecting pressure distribution through equalization of moments of reactive or sustaining pressures of different specific magnitude.

While the embodiments of the invention illustrated on the drawings have been described with considerable particularity, it is to be expressly understood that the invention is not to be limited thereto, as the same is capable of receiving a variety of mechanical expressions, some of which will readily suggest themselves to those skilled in the art, while certain features thereof are capable of use without other features thereof. While the pressure-distributing members have been shown as employed in supporting the bearing portions or segments of the relatively stationary bearing member, it will be apparent that said members could also be employed in mounting bearing segments or portions comprised in the structure of the relatively rotatable bearing member. Reference is therefore to be had to the appended claims for a definition of the limits of the invention.

What I claim is:

1. A thrust bearing comprising a plurality of tiltable bearing shoes or members, equalizing blocks each adapted to support a group of adjacent shoes, and means for distributing the load between the several equalizers.

2. A thrust bearing comprising a plurality of tiltable bearing shoes or members, a plurality of equalizing blocks each adapted to support a group of adjacent shoes, and an equalizing member for tiltably supporting the equalizing blocks.

3. A thrust bearing comprising a plurality of tiltable bearing shoes or members, a plurality of equalizing blocks each adapted to support a group of adjacent shoes, and an equalizing member for tiltably supporting the equalizing blocks and tiltably mounted on a base.

4. A thrust bearing comprising a plurality of tiltable bearing shoes arranged in groups, a plurality of equalizing blocks each adapted to support a plurality of adjacent shoes, and a pivotal support for each equalizing block.

5. A thrust bearing comprising a plurality of equalizers tiltably mounted on a single tiltable equalizing base, each equalizer supporting a plurality of tiltably mounted shoes.

6. A thrust bearing comprising a plurality of bearing shoes assembled in groups, and a plurality of equalizing members each adapted to support all of the shoes of one group.

7. A thrust bearing comprising a plurality of annularly arranged groups of bearing shoes, and a plurality of tiltable equalizing blocks, all of the shoes of each group being independently and tiltably mounted on a single equalizing block.

8. A thrust bearing comprising a plurality of tiltable bearing shoes assembled in annularly disposed groups, and a plurality of equalizing blocks each adapted to tiltably support all of the shoes of one group.

9. In a thrust bearing, the combination of a plurality of bearing shoes arranged in groups or units, a plurality of equalizing members each arranged to tiltably support all of the shoes of one group or unit, and self-adjusting means for equitably distributing the load on the equalizers and through them on the various groups of shoes.

10. A thrust bearing comprising a tiltable support, a plurality of equalizer members tiltably mounted thereon, and a plurality of bearing shoes assembled in separate groups, all of the shoes of each group being tiltably supported by a single equalizer member.

11. A thrust bearing comprising a plurality of groups of bearing shoes, an equalizer member for each group adapted to uniformly distribute the bearing pressure on the individual shoes thereof, and self-adjusting means adapted to equalize the load on the different equalizing members.

12. In a thrust bearing, the combination of a plurality of bearing shoes arranged in groups or units, equalizing members each arranged to tiltably support all the shoes of one group or unit, and a single tiltable member for equally distributing the load on the equalizing members.

13. In a thrust bearing, the combination of relatively rotatable bearing members, one of said members having a thrust surface and the other of said members comprising a universally pivoted carrier, a plurality of groups of bearing shoes, and interposed equalizers each supporting the shoes of one group and equalizing the pressure thereon.

14. In a thrust bearing, the combination of relatively rotatable bearing members, one of said members having a thrust surface and the other of said members comprising a base, a carrier mounted thereon and forming a ball and socket joint therewith, a plurality of groups of bearing shoes, and equalizing blocks interposed between the carrier and the shoes and each supporting the shoes of one group and equalizing the pressure thereon.

15. In a thrust bearing, the combination of relatively rotatable bearing members, one of said members having a thrust surface, and the other of said members comprising a base, a carrier mounted thereon and forming a ball and socket joint therewith, a plurality of groups of bearing shoes, and a plurality of equalizing members tiltably mounted on said carrier and each tiltably mounting all of the shoes of one group.

16. In a thrust bearing the combination of relatively rotatable bearing members, one of said members having a thrust surface, and the other of said members comprising a universally pivoted carrier having an annular groove, a series of tangentially tiltable blocks supported in said groove, and a plurality of groups of bearing shoes tiltably mounted on said blocks.

17. In a thrust bearing, the combination of relatively rotatable bearing members, one of said members having a thrust surface, and the other of said members comprising a universally pivoted carrier having an annular groove, a series of tangentially tiltable blocks supported in said groove, and a plurality of pairs of bearing shoes tiltably mounted on said blocks.

18. In a thrust bearing, the combination of relatively rotatable bearing members, one of said members having a thrust surface, and the other of said members comprising a universally pivoted carrier having an annular groove, a series of tangentially tiltable blocks supported in said groove, and a plurality of groups of bearing shoes mounted on said blocks and adapted to tilt both radially and tangentially relative thereto.

19. In a thrust bearing, the combination of relatively rotatable bearing members, one of said members having a thrust surface, and the other of said members comprising a universally pivoted carrier having an annular groove, a series of tangentially tiltable blocks supported in said groove, and a plurality of groups of bearing shoes tiltably mounted on said blocks, said carrier being formed to loosely hold the shoes in position.

20. A bearing comprising relatively rotatable bearing members one of which includes a circumferential series of bearing portions, and a plurality of separately-acting pressure-distributing members mounting said bearing portions to respond to the wedging action of the lubricating fluid, said bearing portions and pressure-distributing members being interrelated to predeterminately distribute the pressure on said bearing portions.

21. A bearing comprising relatively rotatable bearing members one of which includes a circumferential series of bearing segments, and a plurality of separately-acting pressure-distributing members tiltably mounting said segments, said segments and pressure-distributing members being interrelated to predeterminately distribute the pressure on said segments.

22. A bearing comprising relatively rotatable bearing members one of which includes a circumferential series of bearing portions adapted to respond to the wedging action of the lubricating fluid, and a plurality of separately-acting pressure-distributing means coacting with said bearing portions and interrelated therewith to predeterminately distribute the bearing pressure thereon.

23. A bearing comprising a plurality of tiltable bearing segments, a plurality of equalizing members each adapted to support a group of adjacent segments, and equalizing means for supporting the equalizing members.

24. A bearing comprising a circumferential series of grouped bearing segments, and a plurality of pressure-distributing members each mounting all of the bearing segments of one group.

25. A bearing comprising a plurality of bearing segments, a plurality of pressure-distributing members each forming the sole mounting for a group of segments, and pressure-distributing means for mounting said members.

26. A bearing comprising a plurality of grouped bearing segments, a plurality of pressure-distributing members each tiltably mounting all of the segments of one group, and means for distributing the pressure among said groups of segments.

27. A bearing comprising a plurality of grouped bearing segments, a plurality of pressure-distributing members each predeterminately distributing the pressure among the segments of each group, and pressure-distributing means for distributing the load on said members.

28. A bearing comprising a plurality of grouped bearing segments, a plurality of pressure-distributing members each mounting all of the segments of one group, and a single pressure-distributing member for mounting said members.

29. A bearing comprising a plurality of grouped bearing segments, a plurality of pressure-distributing members each tiltably mounting all the segments of one group, and a single pressure-distributing member tiltably mounting said members.

30. A bearing comprising a plurality of grouped bearing segments, an equalizing member for each group of segments, and equalizing means for said equalizing members.

31. A bearing comprising a plurality of grouped bearing segments, means for predeterminately distributing the pressure among the segments of each group, and means for predeterminately distributing the pressure among the groups of segments.

32. A bearing comprising a plurality of grouped bearing segments, members for equitably distributing the pressure among the segments of each group, and a member for equitably distributing the pressure among said members.

33. A bearing comprising a plurality of bearing segments and an equalizing lever on which all of said segments are mounted, to tilt both radially and tangentially with respect thereto.

34. A bearing comprising an annularly arranged plurality of grouped bearing segments, and a plurality of equalizing levers on each of which all of the segments of one group are mounted to tilt both radially and tangentially.

35. A bearing comprising a plurality of grouped bearing segments, a plurality of equalizing levers on each of which all of the segments of one group are tiltably mounted, and an equalizing member on which said equalizing levers are tiltably mounted.

36. A bearing comprising a plurality of grouped bearing segments, and a plurality of pressure-distributing members on each of which all of the segments of one group are mounted to tilt both radially and tangentially.

37. A bearing comprising a plurality of grouped bearing segments, a plurality of pressure-distributing members on each of which all of the segments of one group are mounted, and a pressure-distributing member for equitably distributing the pressure among said last-named members.

38. A bearing comprising a plurality of bearing segments, and a plurality of pressure-distributing members predeterminately distributing the pressure among said bearing segments in groups.

39. A bearing comprising a plurality of bearing segments, a plurality of pressure-distributing members predeterminately distributing the pressure among said bearing segments in groups, and means for distributing the pressure among the several groups of bearing segments.

40. A bearing comprising a plurality of bearing segments divided into groups, and a member balancing the pressures on the segments of each group.

41. A bearing comprising a plurality of bearing segments divided into groups, a member for each group of segments operating to balance the pressures on the segments thereof, and means balancing the pressures on the several groups of segments.

42. A bearing comprising a pressure-distributing member tiltably mounted on a single axis, and bearing segments entirely supported on said member on opposite sides of said axis and adapted to tilt both radially and tangentially with respect thereto.

43. A bearing comprising relatively rotatable bearing members one of which includes a plurality of bearing segments, and a plurality of means for interbalancing the bearing pressure on said segments in groups.

44. A bearing comprising relatively rotatable bearing members one of which includes a plurality of bearing segments, a plurality of means for interbalancing the bearing pressure on said segments in groups, and means for equitably distributing the bearing pressure between the respective groups.

45. A bearing comprising relatively rotatable bearing members one of which includes a plurality of grouped bearing portions, and means associated with each group of bearing portions for predeterminately distributing the bearing pressure on the bearing portions thereof.

In witness whereof, I have hereunto set my hand this 22 day of March, 1916.

ALBERT KINGSBURY.